Jan. 6, 1931.    E. FRANKLAND    1,787,779
SHOCK ABSORBING UNIVERSAL JOINT
Filed Aug. 15, 1927
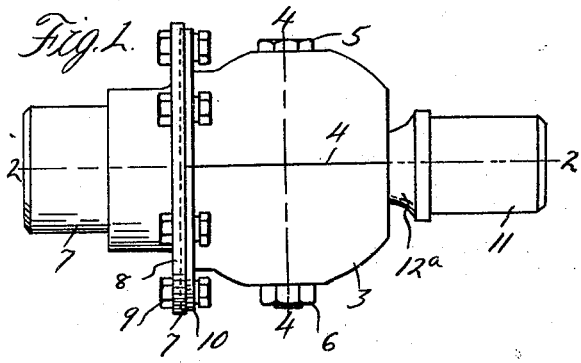
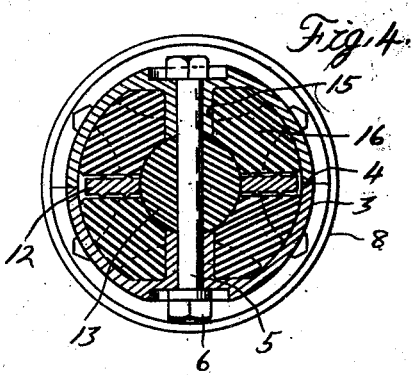
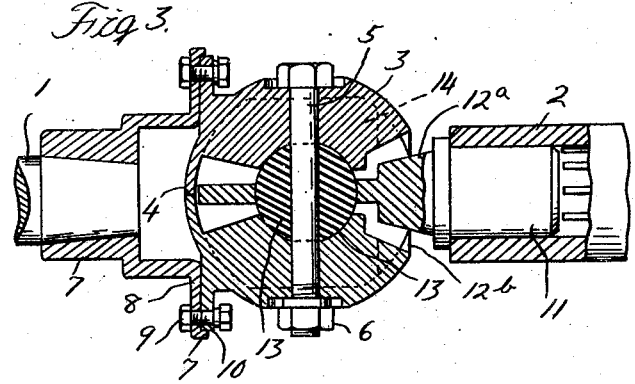
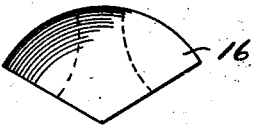
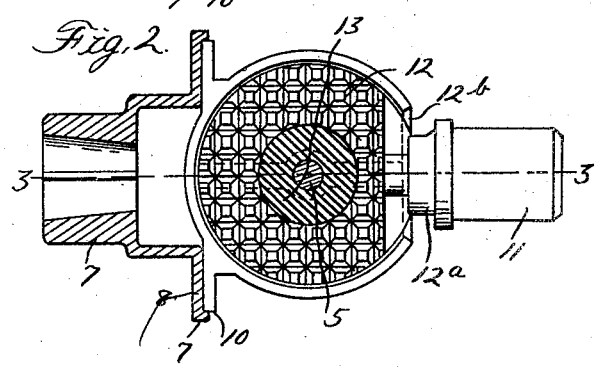
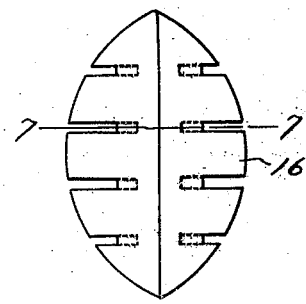
Inventor
Edwin Frankland
By Swan, Frye, & Murray
Attorneys Patented Jan. 6, 1931

1,787,779

UNITED STATES PATENT OFFICE

EDWIN FRANKLAND, OF MILWAUKEE, WISCONSIN

SHOCK-ABSORBING UNIVERSAL JOINT

Application filed August 15, 1927. Serial No. 212,949.

This invention relates to universal joints, and particularly to universal joints for motor vehicle use.

One of the objects of this invention is to provide a universal joint employing cushioning members for establishing the drive, adapted to reduce the shock and strains incident to starting, stopping, and to speed changes of a motor vehicle, and also to prevent transmission of what are known as telephonic noises between the driving and driven members of a universal joint.

One of the defects of present type of flexible universal joints of motor vehicles is a tendency of the propeller shaft to develop more or less eccentricity of travel with respect to the driving member, this being commonly known as propeller shaft whip. It is also one of the objects of this invention to establish and maintain an accurate centering of the propeller shaft with respect to the driving member of a universal joint so as to eliminate the described effect.

Another object is to provide a universal joint, the driving and driven elements of which act upon each other solely through cushioning elements which are non-conductors of vibration and which eliminate noise and rattle.

A further object is to provide a universal joint eliminating necessity for lubrication and so encased as to prohibit any access of oil or dust to the interior elements of the joint.

Still another object is to provide a universal joint establishing a drive through yielding members which are subject to practically no wear and only to compression stresses, being never in shear.

A still further object is to provide a shock absorbing universal joint of simple and inexpensive construction comprising a minimum number of parts which may be rapidly and easily assembled.

It is also an object to provide a universal joint comprising yieldable shock absorbing elements through which the drive is normally established and to assure a continued driving engagement even if said yieldable elements undergo complete destruction.

These and various other objects the invention attains by the construction hereinafter described and illustrated in the accompanying drawing, wherein:

Figure 1 is a side elevational view of the improved joint.

Figure 2 is an axial longitudinal sectional view taken approximately upon the line 2—2 of Figure 1.

Figure 3 is an axial longitudinal section upon the line 3—3 of Figure 2.

Figure 4 is a cross-sectional view taken upon the line 4—4 of Figure 1.

Figure 5 is a plan view of one of the cushioning driving elements of the joint.

Figure 6 is a rear view of the same.

Figure 7 is a cross-sectional view of the same taken upon the line 7—7 of Figure 6.

In these views reference characters 1 and 2 designate driving and driven shaft members, the latter in the disclosed embodiment of this invention being tubular. The joint establishing a drive connection between said shafts comprises a spherical socket member 3 formed of two complementary members meeting as indicated at 4, in a diametrical plane of the socket intersecting the driving axis of the joint. Said members are secured in their proper complementary relation primarily by a bolt 5 extending diametrically of the socket and transverse to the plane of the meeting edges 4, said bolt being suitably headed at one end, and engaged at its other end by a nut 6. For mounting the socket member 3 upon the shaft 1 there is keyed or otherwise secured upon said shaft a collar 7 formed with an annular flange 8, which is bolted, as indicated at 9, to an annular flange 10 formed integrally with the complementary members of said socket. Preferably the flange 8 is slightly increased in thickness adjacent to its circumference so as to slightly overlap the edge face of the flange 10, so as to supplement the bolt 5 in maintaining the halves of the socket member in complementary relation.

Into the shaft 2 is pressed or otherwise secured a plug 11 which integrally carries a disc 12 disposed centrally within the socket 3 with a marginal clearance from the interior face of said socket, as is best seen in Figure 2. It is preferred to form the member 11, 12 with a reduced neck 12a between the parts 11 and 12 to increase the clearance between the member 11, 12 and the edge of a circular opening 12b, through which said member projects from the socket, said opening being jointly formed in the halves of said socket.

To maintain the disc 12 properly centered in the socket 3 it is preferred to mount centrally and rotatably upon the bolt 5 a ball 13, formed preferably of a sound insulating material such as will not transmit noises through the joint, said ball fitting in a suitable opening centrally formed in the disc 12. The ball 13 is maintained in its central position upon the bolt 5 by similarly forming the complementary members of the socket 3 with radial interior ribs 14, the inner edges of which conform to the surface of said ball, which ribs are centrally enlarged and bored, to form bearings 15 for the bolt 5.

The disc 12 and ribs 14 divide the interior space of the socket into four segmental chambers in each of which is fitted a similar yieldable shock absorbing, drive-transmitting element 16, formed preferably of rubber sufficiently soft to undergo a suitable degree of compression and expansion responsive to variations in the driving stresses or torque. Said elements form approximate quarters of a sphere, each having two normally transverse faces engaging respectively the disc 12 and one of the ribs 14. To render said elements more elastically responsive to the driving torque, it is preferred to form each of said elements with a plurality of slots 17 opening in the plane faces of said elements and extending transversely to the driving axis of the joint.

To eliminate sliding of the elements 16 relative to the engaged faces of the disc 12 under driving conditions, and to avoid the wear and the generation of heat that would result from such sliding, it is preferred to form the disc 12 in each of its side faces throughout the area of said faces with a plurality of small projections, as may best be seen in Figure 2, which projections under driving conditions imbed themselves in the elements 2 and thus secure the desired result.

In the use of the described joint, assuming the shaft 1 to be driven, the socket 3 will first undergo a slight rotation relative to the disc 12, such as will place a compressive stress upon two diametrically opposed elements 16, the other two of said elements expanding under such conditions and exercising no function in transmitting the drive. The two elements 16 which are thus compressed act to absorb the stress of starting (or of speed changes) by virtue of such compression, and when such compression reaches a predetermined degree said elements will act from the ribs 14 upon the disc 12 to drive the shaft 2, thus establishing the drive without metallic contact of any sort between the driving and driven members. When a reverse drive is transmitted through the joint the two elements 16 which function as driving members, and are consequently under compression, are the same two elements which are permitted to expand during a forward drive. The constantly occurring changes in the angular relation between the shafts 1 and 2 are permitted by a slight rocking of the disc 12 upon the ball 13 about the axis of the bolt 5, and by subjection of the segments 16 to a slight compression acting from end to end of said members.

Since the elements 16 respond to driving stresses almost entirely by internal distortion there is no appreciable wear upon said members, and they may be depended upon to function properly during the entire useful life of the motor vehicle, or other mechanism of which the described joint is a feature.

The use of elastic elements 16 renders the use of lubricant unnecessary. Furthermore, owing to the detrimental action of oil upon rubber, it is desirable to adequately safeguard the joint against any access of lubricating or other oils to said elements 16. The complete enclosure of said elements within the socket forming member establishes such a safeguard.

If through carelessness or abuse of the mechanism of which said joint is a part, the strains arising are sufficiently severe to disintegrate the rubber drive elements 16, there will still be maintained a drive connection through the engagement occuring under such conditions between the disc 12 and ribs 14.

It will be noted that the construction comprises relatively few parts and that these may be readily formed without machining of surfaces and may be quickly and easily assembled.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. A universal joint comprising a socket member formed in complementary halves, meeting in a plane intersecting the driving axis of said socket, a connection between the halves of said socket extending through the socket, a rib interiorly projecting from each half of said socket, a disc member within said socket, and yieldable shock-absorbing members disposed within said socket between said disc member and ribs and transmitting a drive therebetween.

2. A universal joint comprising a driving and a driven member, one thereof forming a substantially spherical socket, a ball carried by said socket member, means holding the said ball centered in said socket member, the other of said driving and driven members being disposed within said socket member and centered therein by engagement with said ball, and yieldable shock-absorbing elements arranged within said socket member around said ball and establishing a drive between said members.

3. A universal joint comprising a driving and a driven member, one thereof forming a substantially spherical socket, formed in complementary halves, a bolt extending diametrically of said socket and securing said halves in their complementary relation, a ball carried by said bolt centrally within the socket member, a pair of ribs formed one upon each half of the socket member projecting into said member and holding said ball centered upon the bolt, the other of said driving and driven members having the form of a disc disposed within the socket member and centrally apertured to embrace said ball, and a plurality of yieldable shock-absorbing drive elements disposed within the socket between said disc and ribs.

4. A universal joint comprising a driving and a driven member, one thereof forming a substantially spherical socket and the other forming a disc disposed within said socket, means maintaining said disc centered within the socket providing for a limited universal movement of the disc relative to the socket member, and a plurality of yieldable shock-absorbing elements within the socket transmitting a drive between the disc member and socket member, the disc member having protuberances upon its lateral faces to eliminate sliding between said faces and said shock absorbing elements.

5. A universal joint comprising a driving and a driven member, and a plurality of yieldable shock-absorbing elements establishing a drive connection between said members, said elements being channeled to increase their compressibility.

6. A universal joint comprising a driving and a driven member, one thereof forming a substantially spherical socket having interior driving projections, and the other of said members being disposed within said socket between said projections, and a plurality of yieldable shock-absorbing elements disposed within said socket between said projections and the said member within the socket transmitting a drive therebetween, said shock absorbing members being each formed with a plurality of channels extending transversely to the driving axis of the joint for increasing the compressibility of said elements.

7. A universal joint comprising a driving and a driven member, one thereof forming a substantially spherical socket and the other being disposed within said socket, means maintaining the member within the socket substantially centered in the socket, a pair of opposed interior driving projections upon the socket, yieldable shock absorbing elements within the socket transmitting a drive between said member therein and said interior projections of the socket, said interior member and said yieldable elements having interfitting portions to resist sliding between their engaged faces.

8. A universal joint comprising a driving and a driven member and a plurality of yieldable shock absorbing elements establishing a drive connection between said members, said elements being each formed with a plurality of openings to increase their compressibility.

9. A universal joint comprising a driving and a driven member, one thereof having the form of a substantially spherical socket and the other being disposed within said socket, a ball formed of sound insulating material disposed substantially centrally in said socket member for centering said inner member of the joint, means carried by the socket member for holding said ball centered within the socket, a pair of interior driving projections upon the socket at opposite sides of said interior member, and shock absorbing elements within the socket establishing a drive between said interior member and the socket.

10. A universal joint comprising a driving and a driven member, one thereof forming a substantially spherical socket, receiving the other and being formed with a pair of opposed interior driving projections, a ball arranged centrally within said socket for centering the other of said members, means passing through said ball and attached to the socket member for holding said ball centered in the socket and yieldable shock absorbing drive elements disposed within the socket establishing a drive between said inner of the two first named members and said driving projections.

11. A universal joint comprising a driving and a driven member, one thereof forming a substantially spherical socket receiving the other and formed in complementary halves, a bolt extending diametrically of said socket and securing said halves in their complementary relation, means carried by said bolt in the central portion of the socket for centering the inner of the two first named members, a pair of opposite interior projections upon the socket member, and yieldable shock absorbing elements within the socket transmitting a drive between said projections and said inner member of the joint.

12. A universal joint comprising a driving and a driven member, one thereof forming a substantially spherical socket, receiving the other, a ball disposed substantially centrally within said socket and centering the inner of the two first named members in said socket, a member extending through said ball in a diametrical relation to the socket, bearings for said diametrical member formed interiorly upon the socket member and centering said ball upon said diametrical member, a pair of interior drive projections on the socket at opposite sides of said ball, and yieldable shock absorbing drive transmission elements between said inner member of the joint and said projections.

In testimony whereof I hereunto set my hand.

EDWIN FRANKLAND.